(12) United States Patent
Thiyanaratnam

(10) Patent No.: US 9,390,110 B2
(45) Date of Patent: Jul. 12, 2016

(54) METHOD AND APPARATUS FOR COMPRESSING THREE-DIMENSIONAL POINT CLOUD DATA

(71) Applicant: Pradeep Thiyanaratnam, Los Angeles, CA (US)

(72) Inventor: Pradeep Thiyanaratnam, Los Angeles, CA (US)

(73) Assignee: Level Set Systems Inc., Palisades, CA (US)

( * ) Notice: Subject to any disclaimer, the term of this patent is extended or adjusted under 35 U.S.C. 154(b) by 464 days.

(21) Appl. No.: 13/875,025

(22) Filed: May 1, 2013

(65) Prior Publication Data

US 2013/0297574 A1 Nov. 7, 2013

Related U.S. Application Data

(60) Provisional application No. 61/641,586, filed on May 2, 2012.

(51) Int. Cl.
*G06F 17/30* (2006.01)
*G06T 9/00* (2006.01)

(52) U.S. Cl.
CPC .......... *G06F 17/30292* (2013.01); *G06T 9/001* (2013.01); *G06T 9/005* (2013.01)

(58) Field of Classification Search
None
See application file for complete search history.

(56) References Cited

U.S. PATENT DOCUMENTS

| | | | |
|---|---|---|---|
| 7,804,498 B1 * | 9/2010 | Graham | G06T 11/206 345/419 |
| 2003/0038798 A1 * | 2/2003 | Besl | G06T 15/00 345/420 |
| 2006/0017799 A1 * | 1/2006 | Sharma | G03G 15/65 347/238 |
| 2010/0239178 A1 * | 9/2010 | Osher | G06T 9/001 382/243 |
| 2010/0296523 A1 * | 11/2010 | Wego | H04J 3/1623 370/503 |
| 2013/0249899 A1 * | 9/2013 | Meeussen | G06T 17/05 345/419 |
| 2013/0265299 A1 * | 10/2013 | Marder-Eppstein | G06T 17/005 345/419 |
| 2013/0297574 A1 * | 11/2013 | Thiyanaratnam | G06F 17/30292 707/693 |
| 2014/0376827 A1 * | 12/2014 | Jiang | G06T 9/40 382/238 |
| 2015/0262075 A1 * | 9/2015 | Nugent | G06N 99/005 706/12 |

* cited by examiner

*Primary Examiner* — Sean Motsinger

(74) *Attorney, Agent, or Firm* — Che-Yang Chen; Law Offices of Scott Warmuth

(57) ABSTRACT

A method and apparatus for compressing three-dimensional point cloud data is disclosed. In one aspect, a method for compressing three dimensional point cloud includes steps of retrieving three-dimensional point cloud data; providing one or more grids to the three-dimensional point cloud data; assigning one binary digit to each three-dimensional grid voxel containing said point cloud data and assigning the other binary digit to each three-dimensional grid voxel that does not have said point cloud data; converting the three-dimensional grid into two-dimensional tiles; and storing information of a plurality of binary strings in said two-dimensional tiles. In one embodiment, the step of storing information of a plurality of binary strings in said two-dimensional tiles includes a step of storing the number of repeating times of each binary digit in the binary strings. The method can significantly reduce memory space, as well as preserving small details of the point cloud.

9 Claims, 8 Drawing Sheets

METHOD AND APPARATUS FOR COMPRESSING THREE-DIMENSIONAL POINT CLOUD DATA

CROSS-REFERENCE TO RELATED APPLICATIONS

This application claims priority under 35 U.S.C. §119(e) to U.S. Provisional Patent Application Ser. No. 61/641,586 filed on May 2, 2012, the entire contents of which are hereby incorporated by reference.

FIELD OF THE INVENTION

This invention relates to a method and apparatus for compressing data. More specifically, this invention relates to a method and apparatus for compressing three-dimensional spatial points (so called "point cloud").

BACKGROUND OF THE INVENTION

A point cloud is a set of vertices in a three-dimensional coordinate system, which is often created by three-dimensional scanners, such as LIDAR (Light Detection And Ranging) systems that measure a large number of points on the surface of an object, and output the point cloud as a data file. The point cloud is a collection of three-dimensional spatial points, representing the visible surface of the object that has been scanned or digitized. For example in FIG. 1, a scatter plot of point cloud data from the scan of the "Happy Buddha" includes 543,652 points in the point cloud, which may cause storage and transmission of such huge data problematic.

Currently, the method of compressing a three-dimensional point cloud is based on reconstructing a surface that fits the point cloud. The computation is on a regular rectangular grid, and the grid points are converted from three-dimensional to two-dimensional tiles. Furthermore, JPEG compression is used to save the information of the two-dimensional tiles. The key to obtain good compression is to compute the levelset function on a tube near the zero interface, and all values outside the tube are considered constant. Namely, most two-dimensional tiled data are constant and can be compressed well using JPEG.

The shrinkwrap algorithm is commonly used to reconstruct the surface on larger objects such as buildings and general terrain, however, it may be difficult to capture some detailed objects, such as power lines, traffic lights and especially trees due to missing areas or areas of low density in the point cloud data. In order to fill in these missing areas, a larger outer contour has to be taken as an initial surface, and the surface shrinks toward the points. As to trees, a large outer contour is formed around the tree and then shrinks toward the leaves, however, the trunk area does not usually resolve well, as the surface gets stuck between the ground and the leaves. Taking a smaller outer contour as the initial guess would solve the problem at the trunk area, but the problem of missing areas elsewhere may arise. In addition to trees, power lines generally have very sparse data points, and the shrinkwrap process usually cannot resolve them.

There are several advantages to use the shrinkwrap algorithm to reconstruct the surface represented by point cloud data, including denoising, path planning, and visibility calculations. However, some users may be more interested in preserving small details. Therefore, there remains a need for a new and improved method and apparatus for compressing three-dimensional point cloud data while preserving the details thereof.

SUMMARY OF THE INVENTION

It is an object of the present invention to provide a method and system for compressing three-dimensional point cloud data to preserve the details of the point cloud such as trees, traffic lights, power lines, etc.

It is another object of the present invention to provide a method and system for compressing three-dimensional point cloud data to increase the processing speed.

It is a further object of the present invention to provide a method and system for compressing three-dimensional point cloud data to preserve most of the data points to precisely reflect the point cloud.

It is still a further object of the present invention to provide a method and system for compressing three-dimensional point cloud data to ease storage and transmission of the data.

According to one aspect of the present invention, a method for compressing three-dimensional point cloud data includes steps of (a) retrieving three-dimensional point cloud data; (b) providing one or more grids to the three-dimensional point cloud data; (c) assigning one binary digit to each three-dimensional grid voxel containing said point cloud data and assigning the other binary digit to each three-dimensional grid voxel that does not have said point cloud data; (d) converting the three-dimensional grid into two-dimensional tiles; and (e) storing information of a plurality of binary strings in said two-dimensional tiles.

In one embodiment, the step of retrieving three-dimensional point cloud data includes a step of computing a close outer contour of the distance function to the point cloud. In another embodiment, the step of assigning one binary digit to each three-dimensional grid voxel containing said point cloud data and assigning the other binary digit to each three-dimensional grid voxel that does not have said point cloud data includes a step of assigning value "1" to the grid voxel containing said point cloud data and assigning value "0" to the grid voxel that does not have said point cloud data.

In an exemplary embodiment, the step of storing information of a plurality of binary strings in said two-dimensional tiles includes step of storing the number of repeating times of each binary digit in the binary strings. The method for compressing three-dimensional point cloud data may further include a step of using JPEG compression to compress the data obtained in step (e).

In another aspect, a method for compressing three-dimensional point cloud data comprising steps of retrieving three-dimensional point cloud data; providing one or more three-dimensional grid voxels to enclose the three-dimensional point cloud data; dividing said three-dimensional grid voxels that contain point cloud data into a predetermined number of subvoxels; forming a binary data set by assigning one binary digit to each subvoxel containing said point cloud data and assigning the other binary digit to each subvoxel that does not contain said point cloud data; assigning one binary digit to said three-dimensional grid voxels that do not contain point cloud data; reshaping the three-dimensional grid voxels into a one-dimensional array; and storing information contained in said one-dimensional array.

In one embodiment, the step of forming a binary data set includes a step of assigning value "1" to the subvoxel containing said point cloud data and assigning value "0" to the subvoxel that does not have said point cloud data. In another embodiment, the step of assigning one binary digit to said three-dimensional grid voxels that do not contain point cloud data includes a step of assigning value "0" to said three-dimensional grid voxels that do not have said point cloud data.

In a further embodiment, the step of reshaping the three-dimensional grid voxels into a one-dimensional array includes a step of converting the binary data set to an integer value; and in an exemplary embodiment, the step of storing information contained in said one-dimensional array includes steps of storing said value "0" according to number of times said value "0" appears consecutively, and assigning a negative sign to the number of times said value "0" appears consecutively.

In a further aspect, a system for compressing three-dimensional point cloud data may include a user interface, a data storage device (such as a hard disc, CD-ROM, DVD or other storage means to store the data loaded or generated in the present system), and memory. In one embodiment, the memory may include a buffer memory for temporary storing data for ease of data processing, a ROM for storing various control programs, and a RAM for storing a processing result such as the compressed data set in the present invention. The system may also include a data receiving device for loading the point cloud data into the system, a central processor for controlling an overall operation of the system, a data compression device, and a bus for interfacing the above units or devices in the system.

The data compression device is configured to compress the point cloud data received from the data receiving device. In one embodiment, the data compression device may include a data managing unit to transform the point cloud data into different formats which is easy to be stored and transmitted, a grid generating unit configured to generate a three-dimensional grid and a corresponding two-dimensional grid to store the data (with different formats) transformed from the point cloud data.

In an exemplary embodiment, the data managing unit may include a computing device to assign the binary digits to the grid voxels (assign value "1" to the voxels containing data points, and value "0" to the voxels containing no data points) and generate a plurality of binary strings. The computing device is also used to convert regular binary strings to modified binary strings that include the number of repeating times of each binary digit. For example, for a binary string [1, 0, 0, 0, 1, 1, 1, 1, 0, 0, 1], the computing device would convert it to the modified binary string [1, 3, 4, 2, 1], which uses much less space to store such information. It is noted that the first digit of each binary string has to be monitored before counting the repeating times.

The present invention together with the above and other advantages may best be understood from the following detailed description of the embodiments of the invention illustrated in the drawings below.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications which might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

This invention relates to a method and apparatus for compressing data. More specifically, this invention relates to a method and apparatus for compressing three-dimensional point cloud data. As stated above, the shrinkwrap algorithm is often used to reconstruct the surface on larger objects and general terrain, but it may be difficult to capture detailed objects such as power lines, traffic lights and trees. Thus, there remains a need for a new and improved method and apparatus for compressing three-dimensional point cloud data while preserving the details thereof.

Figure 1:
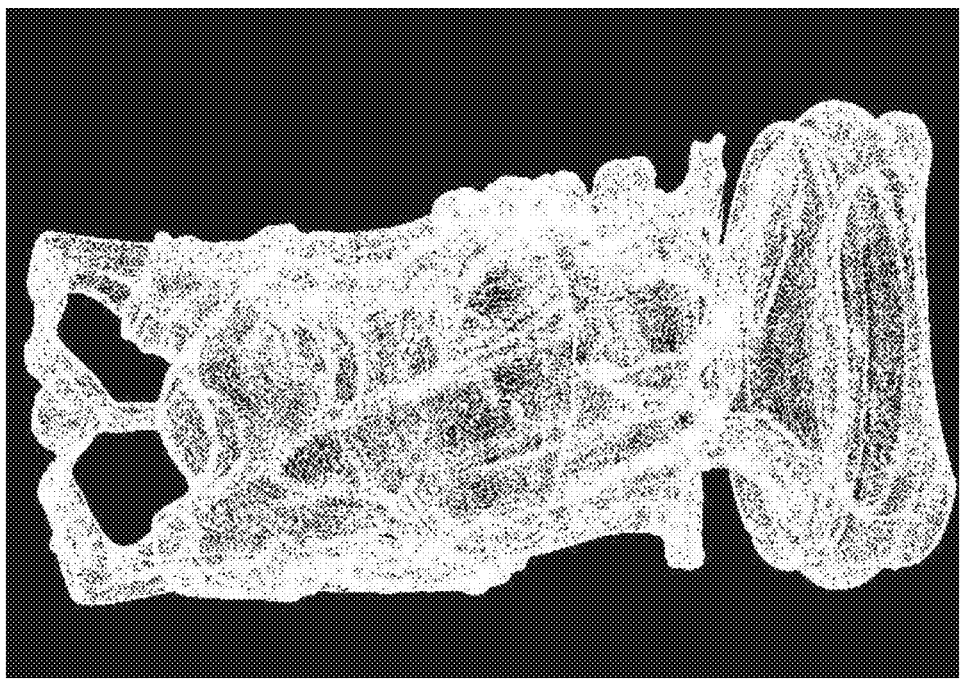
FIG. 1 illustrates a scatter plot of point cloud data from the scan of the Happy Buddha from the Stanford 3D Scanning Repository. There are 543,652 points in the point cloud.
Figure 2:
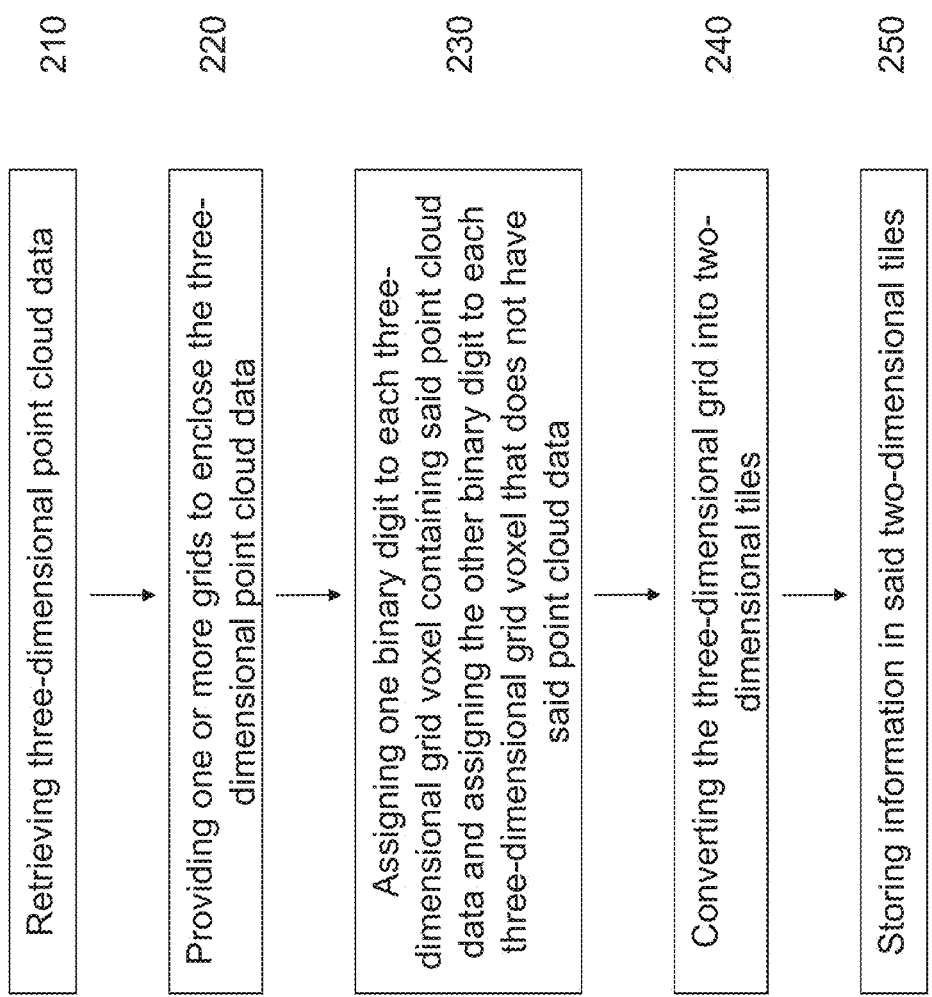
FIG. 2 illustrates a method of compressing three-dimensional point cloud data in the present invention.

In one aspect, a method for compressing three dimensional point cloud includes steps of (a) retrieving three-dimensional point cloud data 210; (b) providing one or more grids to the three-dimensional point cloud data 220; (c) assigning one binary digit to each three-dimensional grid voxel containing said point cloud data and assigning the other binary digit to each three-dimensional grid voxel that does not contain said point cloud data 230; (d) converting the three-dimensional grid into two-dimensional tiles 240; and (e) storing information of a plurality of binary strings in said two-dimensional tiles 250, as shown in FIG. 2.

In one embodiment, the step of retrieving three-dimensional point cloud data 210 includes a step of computing a close outer contour of the distance function to the point cloud. In another embodiment, the step of assigning one binary digit to each three-dimensional grid voxel containing said point cloud data and assigning the other binary digit to each three-dimensional grid voxel that does not have said point cloud data 230 includes a step of assigning value "0" to the grid voxel containing said point cloud data and assigning value "1" to the grid voxel that does not have said point cloud data.

In a further embodiment, the step of storing information of a plurality of binary strings in said two-dimensional tiles 250 includes a step of storing the number of repeating times of each binary digit in the binary strings. The method for compressing three-dimensional point cloud data may further include a step of using JPEG compression to compress the data obtained in step (e).

It is noted that in step 210, a number of small surface pieces around the points will be created to preserve the details of the data, but the surfaces are not continuous. Also, it is advantageous that in the proposed method, the convection step that is the most time-consuming part of the shrinkwrap algorithm has been eliminated, and interpolating the close outer contour would make the point cloud data more complete.

Figure 3:
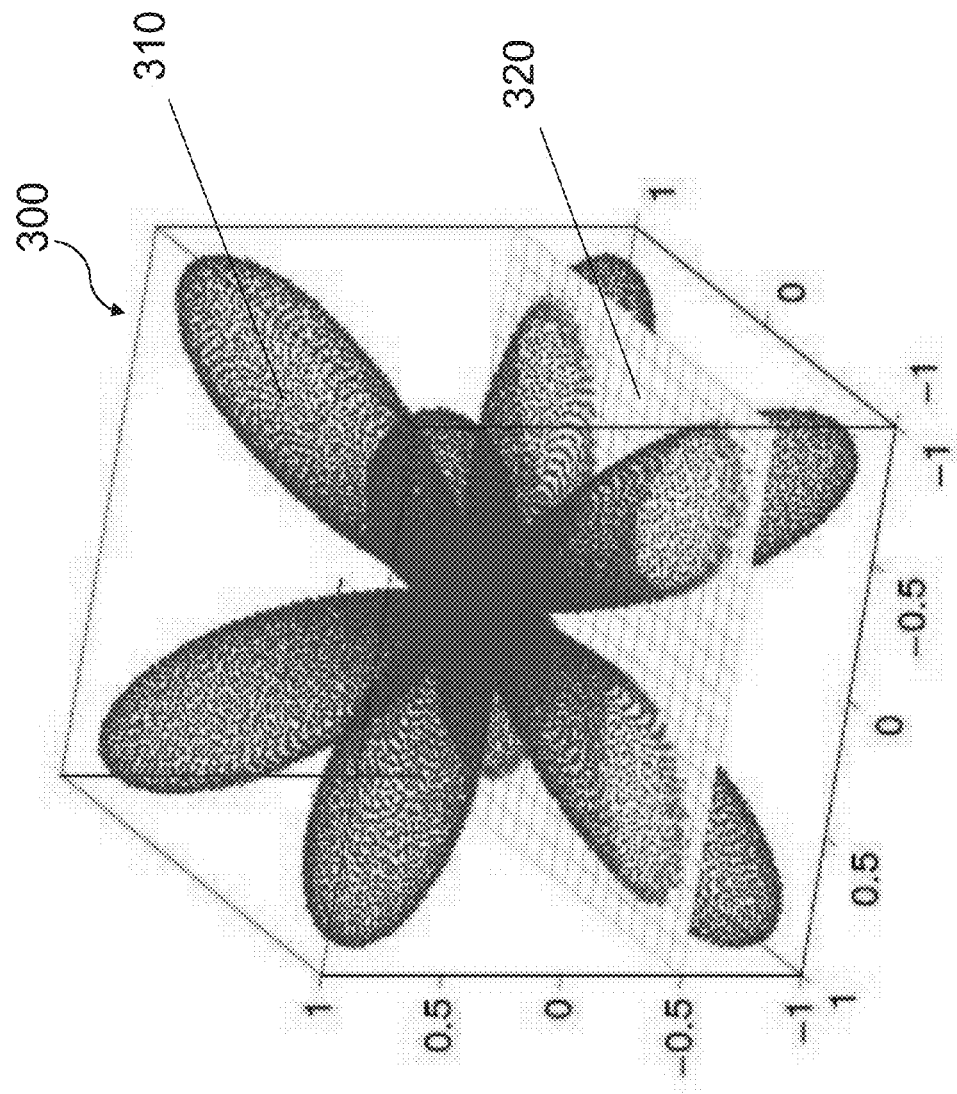
FIG. 3 illustrates an example of managing three-dimensional point cloud data and converting the data to two-dimensional tiles in the present invention.
Figure 3A:
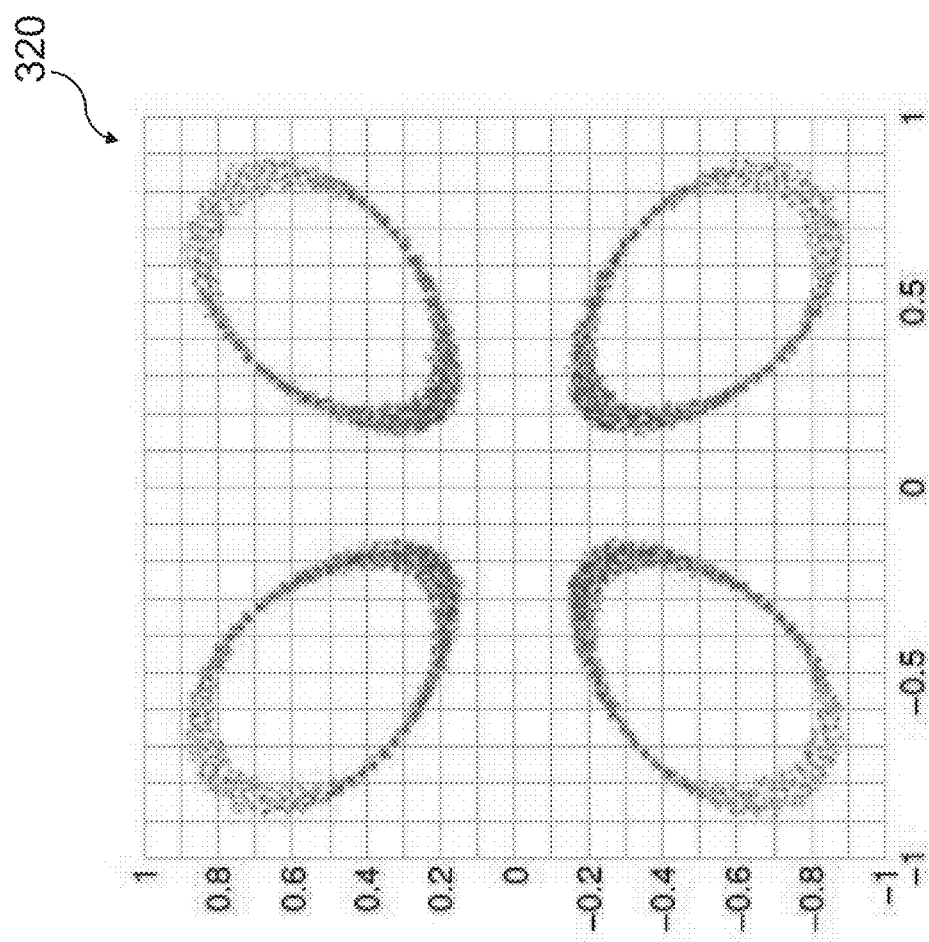
FIG. 3a depicts the two-dimensional tiles extracted from FIG. 3.
Figure 3B:
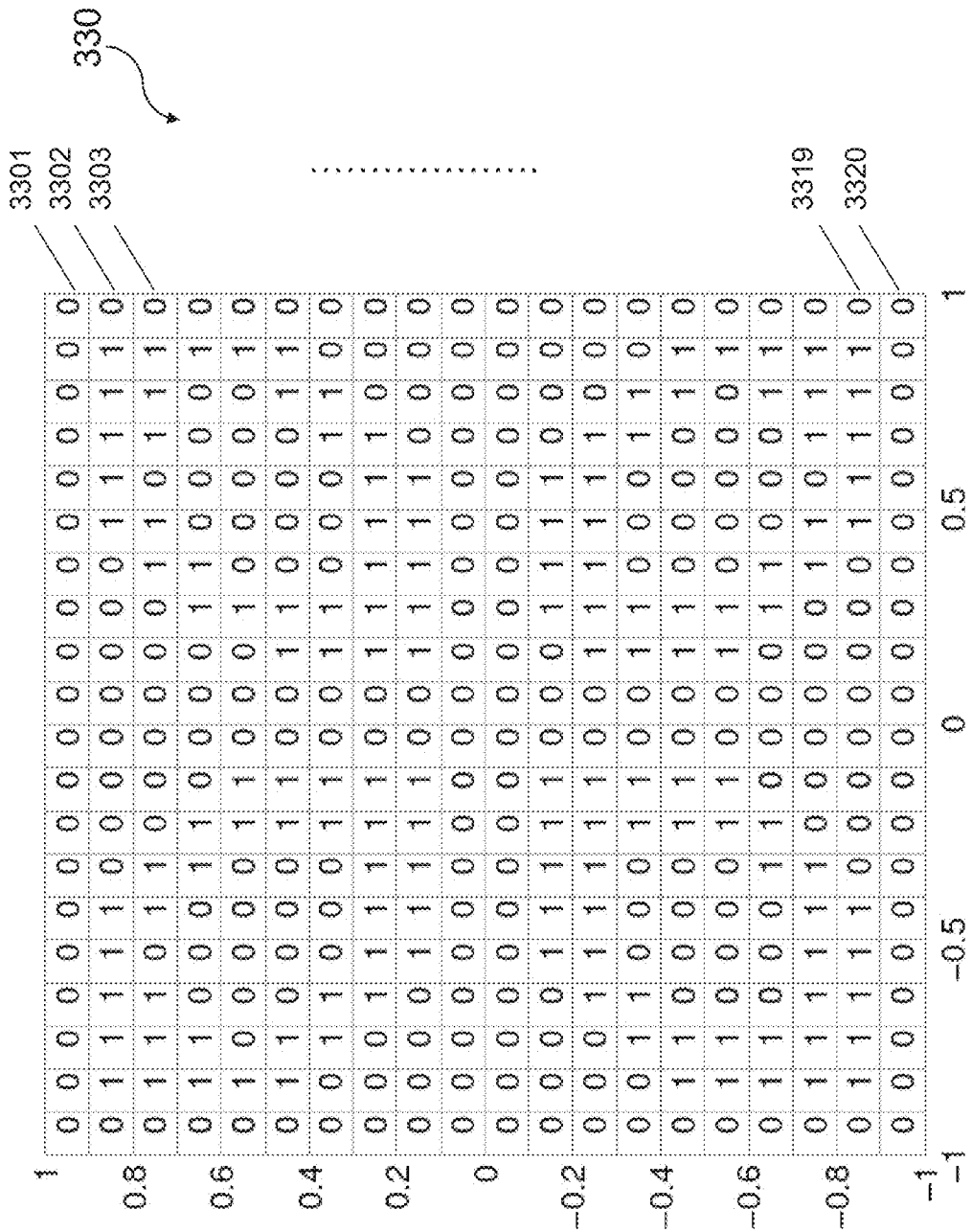
FIG. 3b illustrates that value "1" is assigned to the voxel containing point cloud data, while value "0" is assigned to the voxel containing no point cloud data.

For example, as can be seen in FIGS. 3 and 3*a*, a regular (three-dimensional) grid 300 is arranged to enclose the three-dimensional point cloud data 310, and the regular grid 300 can be further divided into a plurality of grid surfaces 320 having a plurality of two-dimensional tiles. In other words, the three-dimensional grid 300 is converted into a plurality of two-dimensional grid surface 320. In each grid surface 320, value "1" is assigned to the two-dimensional tile containing point cloud data, while value "0" is assigned to the two-dimensional tile that does not contain the point cloud data. As shown in FIG. 3*b*, the grid surface 320 includes a plurality of binary strings 3301, 3302, to 3320, and JPEG compression will be conducted thereafter. However, the file size may still be too large to store.

When the binary string is stored, since most values are "0," we may get a very long series of zeros such as row 3301. To more efficiently store the binary information, we can simply store the number of times each value appears consecutively. For example, in row 3301, we can simply store the information as a modified binary string [20] because value "0" consecutively appears twenty (20) times. In row 3302, the binary information is [0, 1, 1, 1, 1, 1, 0, 0, 0, 0, 0, 0, 0, 0, 1, 1, 1, 1, 1, 0], and can be stored as [1, 5, 8, 5, 1] because value "1" consecutively appears five (5) times from the second to the sixth position, value "0" consecutively appears eight (8) times from the seventh to the fourteenth position, and so on. Thus, the entire three-dimensional cloud data can be more efficiently compressed to two-dimensional tiles, then to a "modified" one-dimensional string.

Moreover, the grid size can be adjusted to obtain different point cloud data with different compression ratio. For example, when the grid size is 5 cm, the compression ratio is about 30:1; and when the grid size is 10 cm, the compression ratio is about 50:1 or better. Even with this improved shrinkwrap method, some points are still lost because some voxels contain more than one data point, and those points can be regarded as redundant points. Also, even though the center of the voxel is chosen to represent the data points contained in the voxel, the error ($Q$) is approximately within ($\sqrt{3}/2$) dx of each uncompressed point. Even using the larger grid size of 10 cm, any point after this improved shrinkwrap method is within 8.7 cm of an original point, which is considered very accurate on the scale of city blocks.

As stated above, some points may be lost since some voxels contain more than one data point. Using the 10 cm grid may keep about half as many data points, while using the 5 cm grid may keep about 60-90% of the original points. However, due to the redundancy of points in the original data, any algorithm applied to the data compressed with this improved shrinkwrap method may work very similar to the original data.

It is also noted that the error $Q$ is the maximum Euclidean distance which is from a point recovered from decompression to an original point in the uncompressed data set. By specifying appropriate error tolerance for a given data set, the fine details and critical geometric features are preserved during the compression/decompression process, while obtaining very high compression ratios and reducing redundant information. Also, the compression speed with appropriate error $Q$ is as fast or even faster than other methods.

Figure 4:
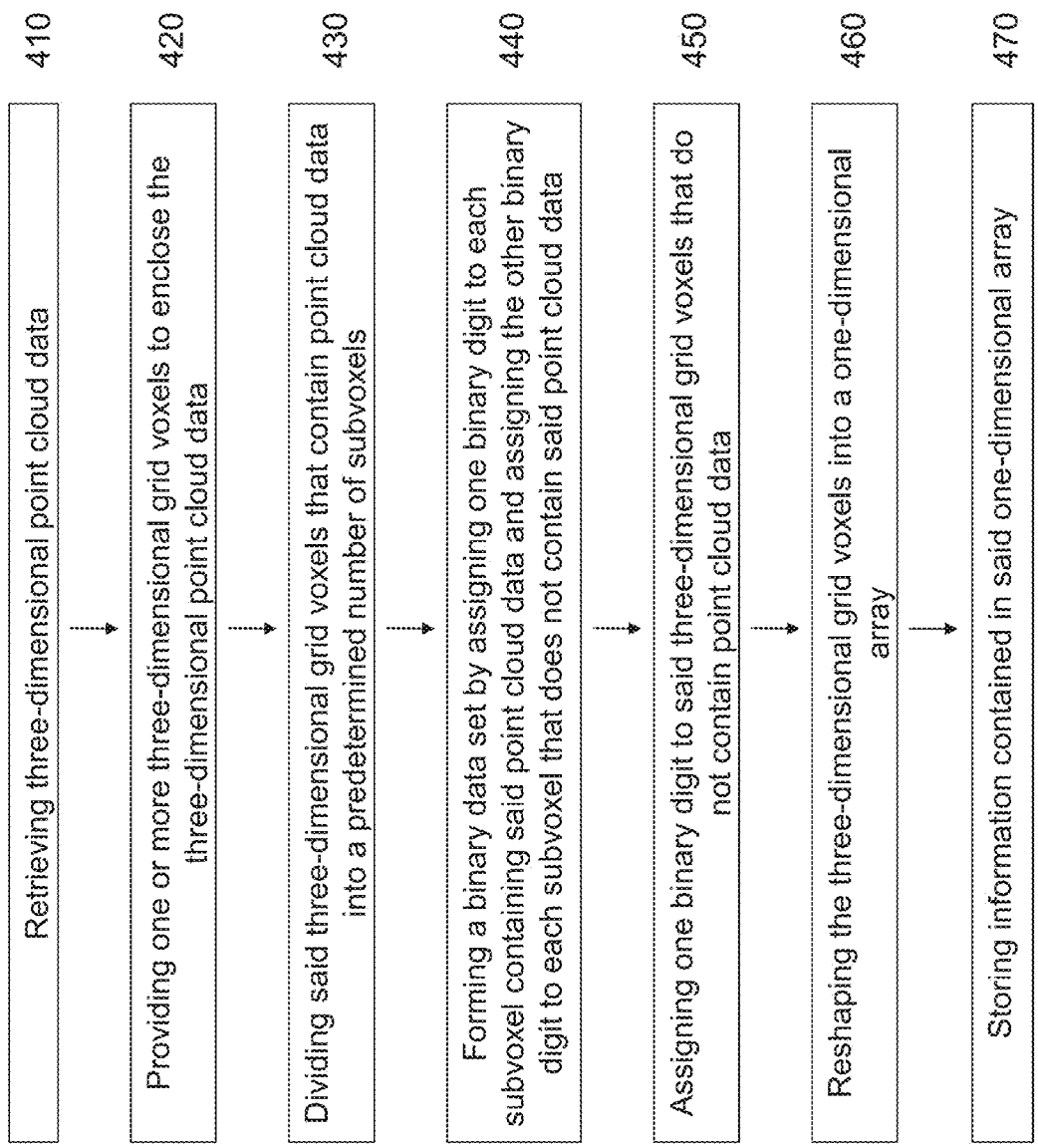
FIG. 4 illustrates a method of compressing three-dimensional point cloud data in another aspect in the present invention.

In another aspect, a method for compressing three-dimensional point cloud data comprising steps of retrieving three-dimensional point cloud data 410; providing one or more three-dimensional grid voxels to enclose the three-dimensional point cloud data 420; dividing said three-dimensional grid voxels that contain point cloud data into a predetermined number of subvoxels 430; forming a binary data set by assigning one binary digit to each subvoxel containing said point cloud data and assigning the other binary digit to each subvoxel that does not contain said point cloud data 440; assigning one binary digit to said three-dimensional grid voxels that do not contain point cloud data 450; reshaping the three-dimensional grid voxels into a one-dimensional array 460; and storing information contained in said one-dimensional array 470, as shown in FIG. 4.

In one embodiment, the step of forming a binary data set 440 includes a step of assigning value "1" to the subvoxel containing said point cloud data and assigning value "0" to the subvoxel that does not have said point cloud data. In another embodiment, the step of assigning one binary digit to said three-dimensional grid voxels that do not contain point cloud data 450 includes a step of assigning value "0" to said three-dimensional grid voxels that do not have said point cloud data.

In a further embodiment, the step of reshaping the three-dimensional grid voxels into a one-dimensional array 460 includes a step of converting the binary data set to an integer value; and in an exemplary embodiment, the step of storing information contained in said one-dimensional array 470 includes steps of storing said value "0" according to number of times said value "0" appears consecutively, and assigning a negative sign to the number of times said value "0" appears consecutively.

For example, let $\{\hat{x}_p; \hat{y}_p; \hat{z}_p\}_{p=1}^{N}$ be a given point cloud, and let $Q > 0$ be a given error tolerance for the compression. Also, let $x_{min} = \min_p \{\hat{x}_p\}$, $x_{max} = \max_p \{\hat{x}_p\}$, and so on to obtain $y_{min}$, $y_{max}$, $z_{min}$, and $z_{max}$. We define the grid size as $$\Delta x = \frac{6\epsilon}{\sqrt{3}},$$

and a discrete 3D function U(x, y, z), which has a domain of:

$[x_{min}, x_{min}+N_x\Delta x] \times [y_{min}, y_{min}+N_y\Delta x] \times [z_{min}, z_{min}+N_z\Delta x]$, where $N_x$, $N_y$, and $N_z$ are the smallest integers to satisfy $x_{max} < x_{min}+N_x\Delta x$, $y_{max} < y_{min}+N_y\Delta x$, and $z_{max} < z_{min}+N_z\Delta x$. $U(x_i, y_j, z_k)$ refers to the value of U in the voxel defined by $[x_i, x_{i+1}] \times [y_j, y_{j+1}] \times [z_k, z_{k+1}]$, where $x_i = x_{min}+i\Delta x$; $y_j = y_{min}+j\Delta x$; $z_k = z_{min}+k\Delta x$. In one embodiment, a 3D array structure of 32-bit integer values is used to store U.

The values U defined on the discrete domain will encode the locations of the points in the point cloud, $\{\hat{x}_p, \hat{y}_p, \hat{z}_p\}_{p=1}^{N}$. In an exemplary embodiment, empty voxels will be given a zero value, while occupied voxels will be encoded in a special way that allows for up to 27 spatial positions within the voxel.

Figure 4A:
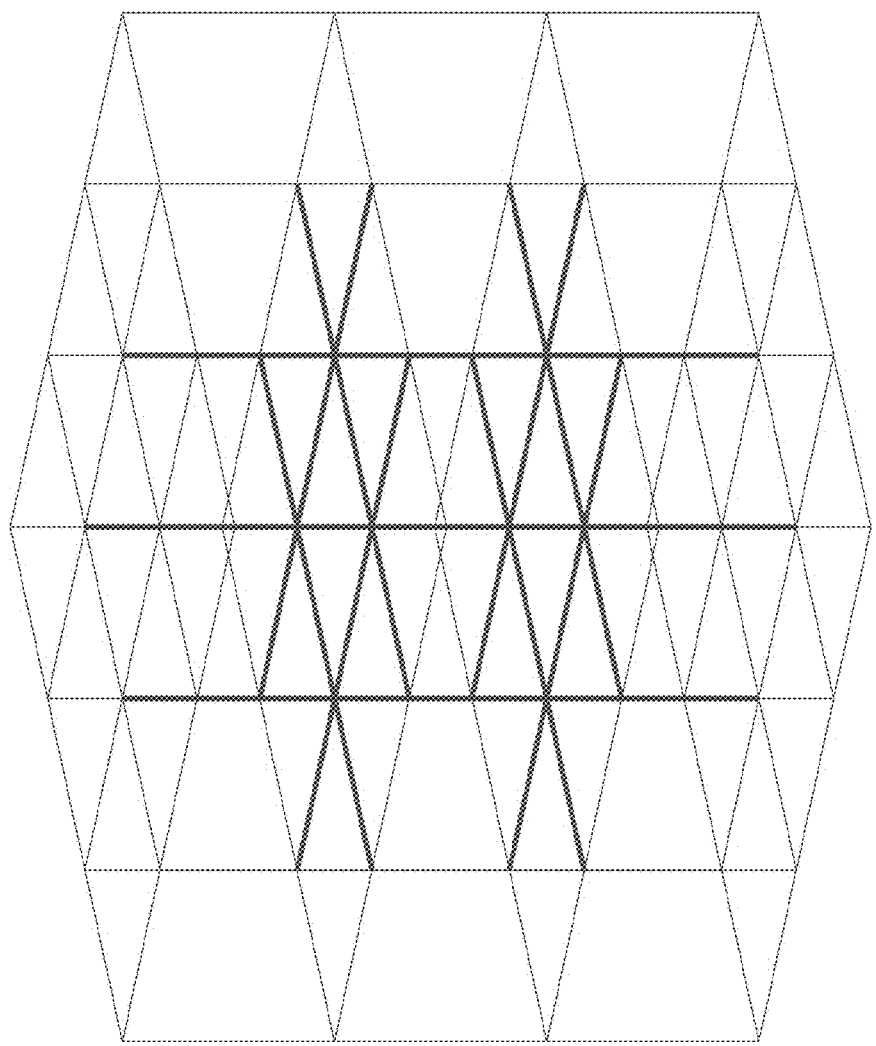
FIG. 4a illustrates a schematic view of a voxel containing 27 subvoxels in the present invention.

More specifically, the occupied voxel is divided into 27 equal sized subvoxels, which can be obtained by dividing the original voxel by 3 in each dimension. FIG. 4a shows a voxel and 27 subvoxels contained therein, where the subvoxel is numbered from 1 to 27, and a consistent labeling procedure applies to all voxels in the computational grid.

When a data point $(\hat{x}_r, \hat{y}_r, \hat{z}_r)$ is contained in the voxel represented by $U(x_i, y_j, z_k)$, i.e. $(\hat{x}r, \hat{y}r, \hat{z}r) \in [xi, xi+1] \times [yj, yj+1] \times [zk, zk+1]$, it has to further determine which of the 27 subvoxels contain the data point. A single 32-bit integer is used to encode which subvoxels contain data points. It is noted that there are 32 binary values used to store an integer and the first 27 bits of the integer to encode are occupied. Here, value zero (0) indicates an empty subvoxel, while value one (1) indicates an occupied subvoxel. It is also noted that the C++ standard includes a special binary data type called bitset, which can be used for setting binary values as well as converting the bitset-type data into a standard 32-bit integer. The 27 subvoxels can be occupied in any combination and still be encoded by a single integer assigned to the main voxel stored in $U(x_i, y_j, z_k)$.

Moreover, the integer subvoxel encoding is applied to every point in the point cloud $\{\hat{x}_p, \hat{y}_p, \hat{z}_p\}_{p=1}^N$, while all empty voxels are given a zero (0) value. Thus, the discrete 3D function $U(x,y,z)$, either has a zero, or some integer value for each voxel position. Since most point cloud data are obtained from scanning surfaces of objects, many of the values of U after the subvoxel encoding are still zero for the empty spaces. In an exemplary embodiment, the 3D array structure used to store U is "reshaped" into a long one-dimension (1D) array $\upsilon$ having values of zero and positive integer(s) by encoding occupied voxels. As stated above, a long series of consecutive zeros representing large number of empty voxels are expected and a further compression to encode the data is conducted.

For example, if a piece of 1D array $\upsilon$ is [ . . . ,92341234,0, 0,0,0,0,0,0,0,0,0,0,0,0,0,0,0,0,0,0,0,8723432,0,0,0,0,0, 0,0,23,0,0,0, 0,0,0,0,0,0,0,1753, . . . ], there are 18 consecutive zeros before between 92341234 and 8723432. However, if "23" is used to represent 23 zeros, it will not be distinguishable from an occupied voxel having "23" as the encoded value. Thus, a "negative" integer value is used to encode the consecutive zeros, which would be distinguishable from the occupied voxels because the encoded value of the occupied voxel must be a "positive" integer. Thus, the above series can be further encoded as [ . . . ,92341234,−23,8723432,−7,23,−10,1753, . . . ]. In practice, the number of consecutive zeros can be very large, which may occupy huge memory space. However, when the consecutive zeros are further encoded as stated above, the memory space would be significantly saved. It is noted that this encoded array $\upsilon$ can also be compressed using a standard zip compression, which can be written to a file as the compressed data for the point cloud.

It is noted that for certain large data sets, it may require a large amount of memory to store the domain of the 3D array of size $N_x \times N_y \times N_z$. To efficiently use the memory space, the 3D array can be broken up into smaller blocks and each block can be processed as described above to achieve faster computation and greater compression ratios. Furthermore, during the decompression process, the user can specify a region of interest to decompress, and only the blocks containing the points in that region need to be decompressed. Furthermore, some information such as $N_x$, $N_y$, $N_z$, $\Delta x$, $x_{min}$, $y_{min}$, and $z_{min}$ has to be stored for decompression. If the domain is broken up into multiple blocks, each block may have some corresponding data that has to be stored, however, the amount of memory required to store this extra information is negligible and the compression ratio would not be affected.

During the decompression process, the encoded 1D array of positive and negative integers can be read in from the file. As stated above, the negative values indicate the number of consecutive zeros, so the 1D array $\upsilon$ having positive and negative integers can be easily decoded. Incorporating the stored information including $N_x$, $N_y$, $N_z$, the 3D array U can be recovered from $\upsilon$, and once U is constructed, the actual data points in the point cloud can be extracted. Suppose the value $U(x_i, y_j, z_k) = n > 0$, the spatial area of the voxel can be determined using the stored values $\Delta x$, $x_{min}$, $y_{min}$, and $z_{min}$, and the 32-bit integer encodes which of the 27 subvoxels are occupied. Furthermore, using the bitset data type in C++ (or other ways in different programming languages), n can be converted into a binary string of zero and ones. The first 27 values of the binary string correspond to the 27 subvoxels, and the binary string positions that have a value 1 indicate occupied subvoxels corresponding to those positions. If a subvoxel is determined to be occupied, then a center spatial position of that subvoxel as an extracted/decompressed data point is selected. Applying this same procedure to all occupied voxels, i.e., values where U>0, the full decompressed point cloud can be obtained.

Choosing the value of error $Q$ is user and application dependent. Smaller value of $Q$ will result in a decompressed point cloud that is closer to the original and will also have a larger number of decompressed points and result in a lower compression ratio. Thus, the error $Q$ value should be determined according to the desired error and compression ratio.

If a subvoxel is determined to be occupied during the compression process, an original data point is considered inside that voxel. The side length of a subvoxel is $$\frac{1}{3}\Delta x = \frac{2\epsilon}{\sqrt{3}}.$$

If the center of the subvoxel is computed as a decompressed data point, and an original data point is contained within that subvoxel, the maximum distance d between the original point and decompressed data point is $$d = \sqrt{\left[\frac{\epsilon}{\sqrt{3}}\right]^2 + \left[\frac{\epsilon}{\sqrt{3}}\right]^2 + \left[\frac{\epsilon}{\sqrt{3}}\right]^2} = \epsilon.$$

Thus, every decompressed data point is within $Q$ distance of an original data point.

Figure 5:
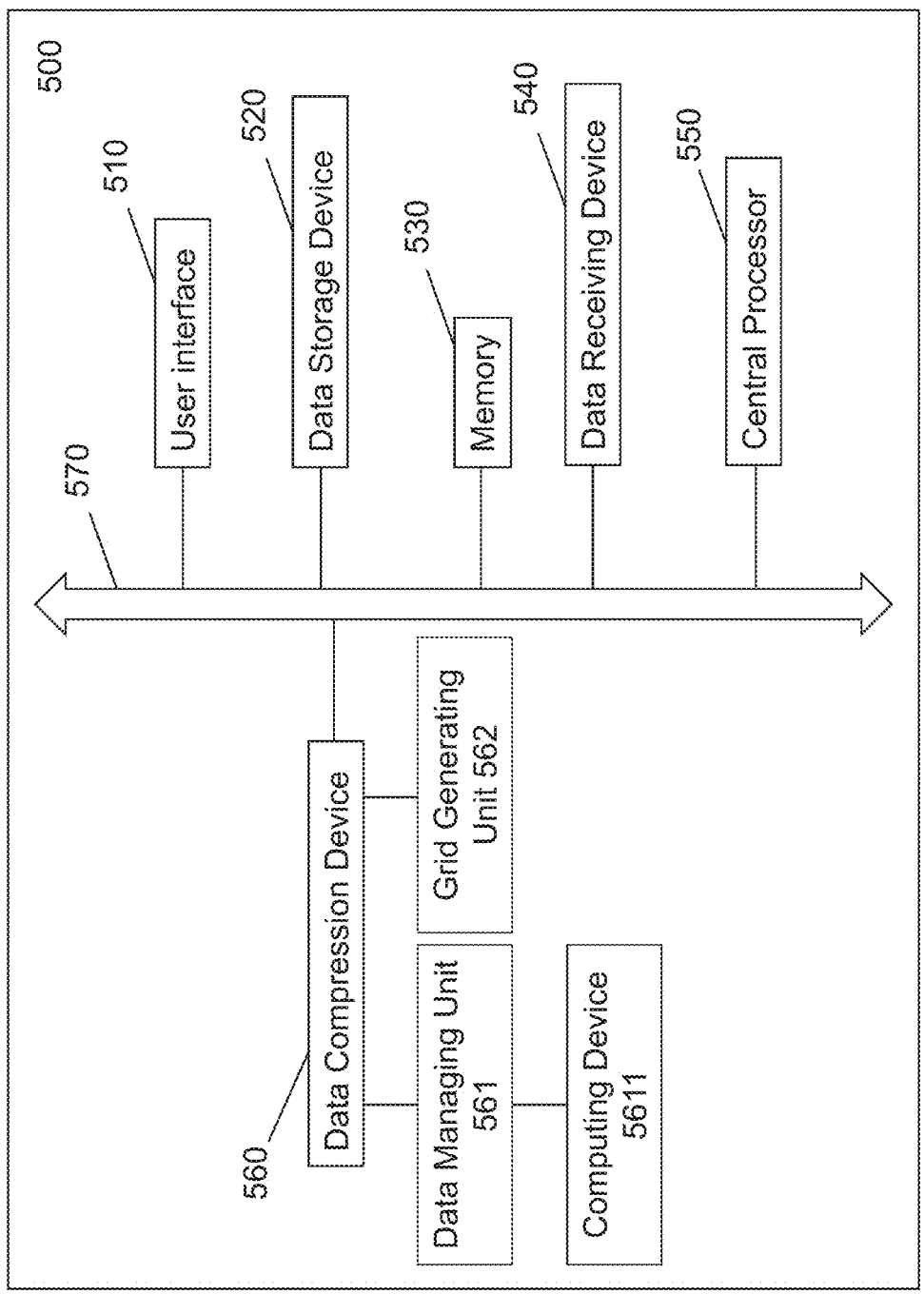
FIG. 5 illustrates a functional block diagram showing an example of structure of a system implementing the method for compressing the point cloud data in the present invention.

In a further aspect of the present invention illustrated in FIG. 5, a system 500 for compressing three-dimensional point cloud data may include a user interface 510 (such as display, mouse, keyboard, etc.), a data storage device 520 such as a hard disc, CD-ROM, DVD or other storage means to store the data loaded or generated in the present in the system, and memory 530. In one embodiment, the memory 530 may include a buffer memory for temporary storing data for ease of data processing, a ROM for storing various control programs and a RAM for storing a processing result such as the compressed data set in the present invention.

The system 500 may include a data receiving device 540 for loading the point cloud data into the system, a central processor 550 for controlling an overall operation of the system, and a data compression device 560. The system 500 may also include a bus 570 for interfacing the above units or devices in the system.

The data compression device 560 is configured to compress the point cloud data received from the data receiving device 540. In one embodiment, the data compression device 560 may include a data managing unit 561 to transform the point cloud data into different formats which is easy to be stored and transmitted, and a grid generating unit 562 configured to generate a three-dimensional grid and a corresponding two-dimensional grid to store the data (with different formats) transformed from the point cloud data.

In a further embodiment, the data managing unit 561 may include a computing device 5611 to assign the binary digits to the grid voxels (assign value "1" to the voxels containing data points, and value "0" to the voxels containing no data points) and generate a plurality of binary strings as shown in FIG. 3b. The computing device 5611 is also used to convert regular binary strings to modified binary strings representing the repeating times of each binary digit. For example, for the binary string 3303, the computing device 5611 would convert [0, 1, 1, 1, 0, 1, 1, 0, 0, 0, 0, 0, 0, 1, 1, 0, 1, 1, 1, 0] to the modified binary string [1, 3, 1, 2, 6, 2, 1, 3, 1].

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A method for compressing three-dimensional point cloud data comprising steps of:
    retrieving three-dimensional point cloud data;
    providing one or more three-dimensional grid voxels to enclose the three-dimensional point cloud data;
    dividing said three-dimensional grid voxels that contain point cloud data into a predetermined number of subvoxels;
    forming a binary data set by assigning one binary digit to each subvoxel containing said point cloud data and assigning the other binary digit to each subvoxel that does not contain said point cloud data;
    assigning one binary digit to said three-dimensional grid voxels that do not contain point cloud data;
    reshaping the three-dimensional grid voxels into a one-dimensional array; and
    storing information contained in said one-dimensional array,
    wherein the step of assigning one binary digit to said three-dimensional grid voxels that do not contain point cloud data includes a step of assigning value "0" to said three-dimensional grid voxels that do not have said point cloud data,
    wherein the step of storing information contained in said one-dimensional array includes steps of storing said value "0" according to number of times said value "0" consecutively, and assigning a negative sign to the number of times said value "0" appears consecutively.

2. The method for compressing three-dimensional point cloud data of claim 1, wherein the step of retrieving three-dimensional point cloud data includes a step of computing a close outer contour of the distance function to the point cloud.

3. The method for compressing three-dimensional point cloud data of claim 1, wherein the step of forming a binary data set includes a step of assigning value "1" to the subvoxel containing said point cloud data and assigning value "0" to the subvoxel that does not have said point cloud data.

4. The method for compressing three-dimensional point cloud data of claim 1, wherein the step of reshaping the three-dimensional grid voxels into a one-dimensional array includes a step of converting the binary data set to an integer value.

5. The method for compressing three-dimensional point cloud data of claim 1, said three-dimensional grid voxel is divided into twenty-seven (27) subvoxels.

6. A system for compressing three-dimensional point cloud data comprising:
    a processor
    a memory storing a computer program that when executed causes the processor to act as:
    a data processing device for receiving the three-dimensional point cloud data and enclosing said three-dimensional point cloud data in one or more three-dimensional grid voxels;
    a compression device for compressing the point cloud data, comprising:
    a voxel dividing device for dividing said three-dimensional grid voxels that contain point cloud data into a predetermined number of subvoxels;
    a first binary data generating device for forming a binary data set by assigning one binary digit to each subvoxel containing said point cloud data and assigning the other binary digit to each subvoxel that does not contain said point cloud data;
    a second binary data generating device for assigning one binary digit to said three-dimensional grid voxels that do not contain point cloud data; and
    a grid reconfiguration device for reshaping the three-dimensional grid voxels into a one-dimensional array; and
    a second memory device for storing information contained in said one-dimensional array,
    wherein the second binary data generating device for assigning one binary digit to said three-dimensional id voxels that do not contain pint cloud data includes a digit assigning processor for assigning value "0" to said three-dimensional grid voxels that do not have said point cloud data,
    wherein the second memory device for storing information contained in said ,one-dimensional array includes an information storing device for storing said value "0" according to number of times said value "0" appears consecutively, and a digit processing device for assigning a negative sign to the number of times said value "0" appears consecutively.

7. The system for compressing three-dimensional point cloud data of claim 6, wherein the first binary data generating device for forming a binary data set includes a first subvoxel data processing device for assigning value "1" to the subvoxel containing said point cloud data and a second subvoxel data processing device for assigning value "0" to the subvoxel that does not have said point cloud data.

8. The system for compressing three-dimensional point cloud data of claim 6, wherein said grid reconfiguration device for reshaping the three-dimensional grid voxels into a one-dimensional array includes a data converting device for converting the binary data set to an integer value.

9. The system for compressing three-dimensional point cloud data of claim 6, said three-dimensional grid voxel is divided into twenty-seven (27) subvoxels.

* * * * *